Nov. 26, 1940.                M. R. KROSS                2,223,256
                        LIQUID SEPARATING DEVICE
                          Filed Dec. 27, 1938
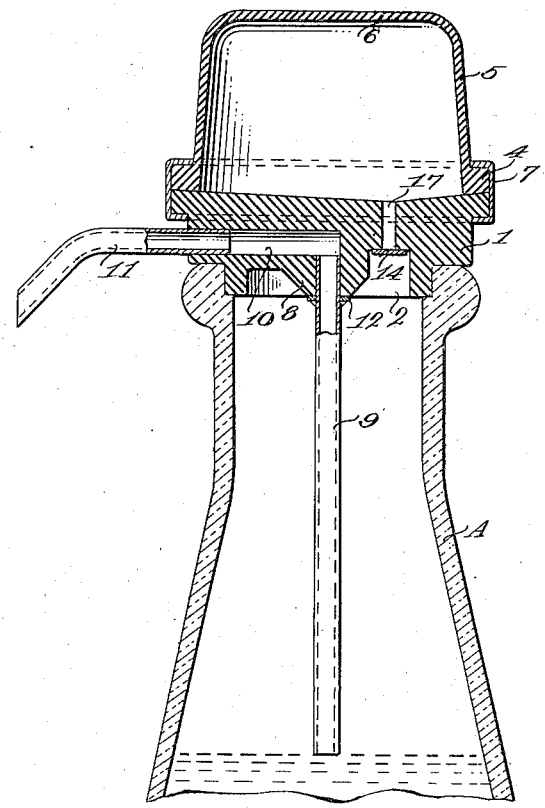
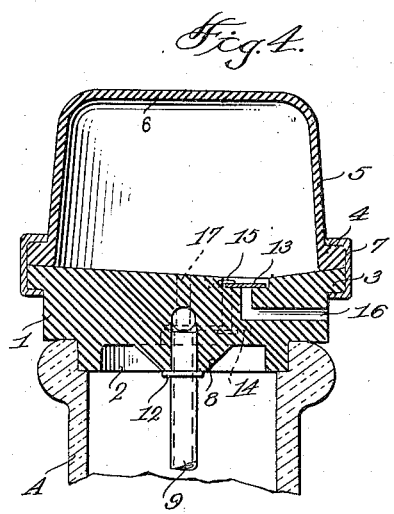
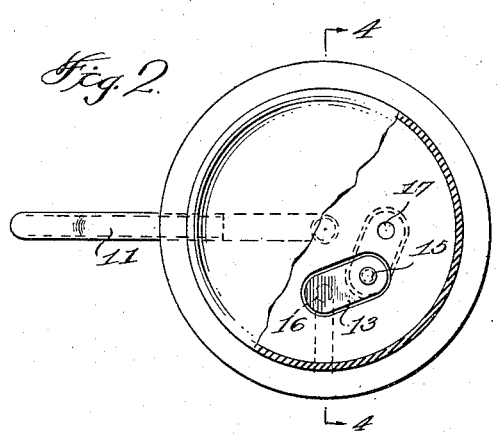
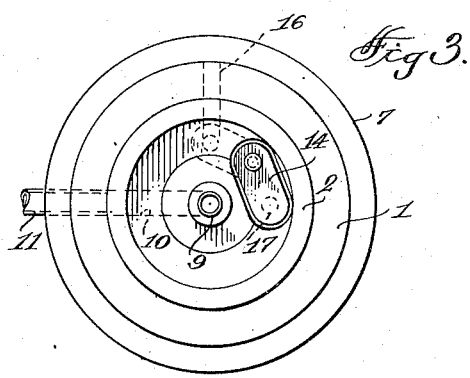
Mark R. Kross
INVENTOR
BY Victor J. Evans & Co.
ATTORNEYS Patented Nov. 26, 1940

2,223,256

UNITED STATES PATENT OFFICE 2,223,256

LIQUID SEPARATING DEVICE

Mark R. Kross, Chicago, Ill.

Application December 27, 1938, Serial No. 247,995

1 Claim. (Cl. 210—51.5)

This invention relates to separating devices, and its general object is to provide a device of that character, which is primarily designed for attachment to a milk bottle of the usual type for separating the cream from the milk, in a manner whereby the cream in its entirety is removed from the bottle without fear of commingling the same with the milk, as by the use of my device the cream is gently forced from the bottle by air pumped therein, thereby eliminating tilting or otherwise moving the bottle which generally causes the milk and cream to become mixed, with the result it will be seen that the cream can be separated and removed in an easy and expeditious manner, with minimum effort on the part of the user.

A further object is to provide a separating device that has all of its parts connected together in a single unit, yet is simple in construction, inexpensive to manufacture, can be readily cleaned and maintained in a sanitary condition, and is extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a vertical sectional view taken through my device applied to a milk bottle.

Figure 2 is a fragmentary top plan view of the device per se, partly in section.

Figure 3 is a bottom plan view thereof.

Figure 4 is a sectional view taken approximately on line 4—4 of Figure 2, looking in the direction of the arrows, with the device applied to the bottle.

Referring to the drawing in detail, the letter A indicates a container which is shown as being a milk bottle of the usual construction, in that it includes a neck having an annular shoulder interiorly of the lip thereof, and while my device is primarily designed for removing cream from milk bottles, it will be obvious that it can be used for removing any kind of liquid, from various types of containers, for transferring the liquid therefrom to another container, vessel or the like.

The device in the form as shown includes a relatively thick disk like body 1 having formed thereon and depending therefrom adjacent to the marginal edge thereof an annular rib 2 of a size and shape to fit within the shoulder of the mouth of the bottle, to be seated therein, in a manner to provide a leak proof connection between the device and bottle, as will be apparent upon inspection of Figures 1 and 4, as the body is preferably made from relatively soft rubber, but it may be made from some suitable hard material and in that event a rubber washer would be used between the rib 2 and the shoulder of the mouth.

Disposed about the upper marginal edge of the body 1 and extending outwardly therefrom is an annular flange 3 adapted to receive an annular flange 4 formed on the skirt 5 of a compressible bulb 6, the latter being of substantially cylindrical formation and is secured to the body by a flanged ring 7, in a leak proof manner, as will be apparent.

Formed on the under surface of the body 1 and depending centrally therefrom is a conical portion 8 within which is secured the upper end of a tube 9 that is disposed in depending relation with respect to the body and has its upper end communicating with a passage 10 extending radially of the body and opening through the side thereof, as best shown in Figure 1. Mounted in the outlet end of the passage 10 is a tube 11 having its outer end portion downwardly flared and beveled as shown, to provide a spout. The tube 9 has secured thereto a collar 12 to limit the movement thereof within the body and so that its upper end will be flush with the bottom of the passage 10 at all times, as shown, but of course it will be understood that the tube 9 can be of any length, it depending upon the use to which the device may be put, but when the device is used as a cream separator, the tube 9 is preferably of a length so that its lower end will terminate slightly above the cream line in a milk bottle when the device is applied thereto, as shown.

The valve means for controlling the passage of air within the bottle to force the cream therefrom is mounted directly on the body, and for that purpose, the body is formed with elongated recesses in the upper and lower surfaces thereof that provide seats for intake and exhaust flap valves 13 and 14 respectively, that are secured within the recesses adjacent one of their ends, by a rivet or the like 15. The flap valve 13 controls an air inlet duct 16 that extends radially of the body with its inner end portion upwardly directed to open within the recess of the valve 13, as best shown in Figure 4, while the valve 14 controls an air duct 17 extending vertically through the body from the upper surface thereof to the recess of the valve 14, as best shown in Figure 1. The valves 13 and 14 are made from any suitable resilient material so that they will open by the action of air against the same but normally remain in closed position so that the ducts 16 and 17 are normally closed.

From the foregoing description and disclosure in the drawing, it is believed that the operation of my device will be obvious, but it might be mentioned that it is applied to a bottle as shown, and upon alternately pressing and releasing the bulb 6 air will be drawn within the bulb through the duct 16 and thence will be passed through the duct 17, the valves 13 and 14 being opened by the air to allow for the free passage of the incoming air, but closing to prevent the return thereof, therefore as the pressure builds up above the cream, it will force the latter from the bottle through the tube 9, passage 10 and tube 11.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A liquid separating device comprising a disk like body having a liquid passage therein and recesses in the upper and lower faces thereof, annular means formed on and depending from the body and being frictionally receivable within a container for detachably securing the body thereto, a tube depending from the inlet end of the passage for disposal within the container, a tube extending from the outlet end of the passage and providing a pouring spout, a substantially cylindrical collapsible bulb rising from the marginal edge of the body, means securing the bulb to the body to provide a leak proof connection between the same, said body having a radially and vertically disposed air duct therein, said duct having its radially disposed portion opening through the side of the body to the atmosphere and its vertical portion opening within the recess of said upper face, said body having an air duct extending vertically therethrough and having its lower end opening within the recess of said lower face for cooperation with the first duct and the bulb to introduce air within the container for forcing liquid from the latter through the passage and said tubes, flap valves fitting and seated within the recesses for controlling the ducts, and means for connecting the flap valves together for securing them within their recesses.

MARK R. KROSS.